United States Patent
Sato et al.

(10) Patent No.: US 9,287,013 B2
(45) Date of Patent: Mar. 15, 2016

(54) MODERATOR TEMPERATURE COEFFICIENT MEASUREMENT APPARATUS

(75) Inventors: Daisuke Sato, Tokyo (JP); Makoto Nakano, Tokyo (JP); Jun Kimura, Kobe (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1411 days.

(21) Appl. No.: 12/377,472

(22) PCT Filed: Jul. 30, 2007

(86) PCT No.: PCT/JP2007/064897
§ 371 (c)(1),
(2), (4) Date: Mar. 15, 2010

(87) PCT Pub. No.: WO2008/020542
PCT Pub. Date: Feb. 21, 2008

(65) Prior Publication Data
US 2010/0220831 A1    Sep. 2, 2010

(30) Foreign Application Priority Data

Aug. 14, 2006    (JP) ................................. 2006-221081

(51) Int. Cl.
*G21C 17/00* (2006.01)
*G21C 7/36* (2006.01)
(Continued)

(52) U.S. Cl.
CPC ........ *G21C 7/36* (2013.01); *G21C 17/10* (2013.01); *G21C 17/108* (2013.01);
(Continued)

(58) Field of Classification Search
USPC ................................................ 376/247, 254
See application file for complete search history.

(56) References Cited

U.S. PATENT DOCUMENTS 2,998,367 A * 8/1961 Untermyer .................... 376/373
4,060,716 A * 11/1977 Pekrul et al. .................. 702/184
(Continued)

FOREIGN PATENT DOCUMENTS

JP    58-124995 A    7/1983
JP    03-084496 A    4/1991
(Continued)

OTHER PUBLICATIONS

Demaziere, Development of a Noise-Based Method for the Determination of the Moderator Temperature Coefficient of Reactivity (MTC) in Pressurized Water Reactors (PWRs), 2002.*
(Continued)

*Primary Examiner* — Jack W Keith
*Assistant Examiner* — Sharon M Davis
(74) *Attorney, Agent, or Firm* — Westerman, Hattori, Daniels & Adrian, LLP (57) ABSTRACT

A moderator temperature coefficient measurement apparatus includes: an input section receiving plant data including a coolant temperature signal being time series data on a temperature of a coolant of a light water reactor, and a reactivity signal indicating time series data on a reactivity calculated based on a detection value of a neutron flux in the light water reactor; a singular value decomposition section decomposing the coolant temperature signal into N components T'1 (t) to T'N (t), and the reactivity signal into M components ρ'1 (t) to ρ'M (t) by a singular value decomposition method; a combination section generating a selected combination being a combination of T'i (t) selected from the N components T'1 (t) to T'N (t) and ρ'j (t) selected from the M components ρ'1 (t) to ρ'M (t); and a temperature coefficient calculation section calculating a moderator temperature coefficient based on auto and cross power spectral density functions obtained by applying a Fourier transformation to the selected combination. The moderator temperature coefficients can be detected at high precision without changing states of the plant.

6 Claims, 4 Drawing Sheets

(51) Int. Cl.
*G21C 17/10* (2006.01)
*G21C 17/112* (2006.01)
*G21C 17/108* (2006.01)

(52) U.S. Cl.
CPC ........ *G21C 17/112* (2013.01); *G21Y 2002/204* (2013.01); *G21Y 2002/304* (2013.01); *G21Y 2004/30* (2013.01); *G21Y 2004/40* (2013.01); *Y02E 30/39* (2013.01)

(56) References Cited

U.S. PATENT DOCUMENTS

| | | | | |
|---|---|---|---|---|
| 4,218,765 | A | * | 8/1980 | Kinkade .................. 367/45 |
| 5,638,413 | A | * | 6/1997 | Uematsu et al. ............ 376/245 |
| 5,960,050 | A | * | 9/1999 | Paxton .................. 376/247 |
| 6,061,412 | A | * | 5/2000 | Stucker et al. ............ 376/217 |
| 2006/0253019 | A1 | * | 11/2006 | Lee ..................... 600/410 |

FOREIGN PATENT DOCUMENTS

| | | |
|---|---|---|
| JP | 2895101 B2 | 3/1999 |
| JP | 2001-255391 A | 9/2001 |
| JP | 2004-125444 A | 4/2004 |
| JP | 2005-134291 A | 5/2005 |
| JP | 2006-105814 A | 4/2006 |

OTHER PUBLICATIONS

Klema, V., Laub, A., The Singular Value Decomposition: Its Computation and Some Applications, Apr. 1980, vol. AC-25, No. 2, IEEE Transactions on Automatic Control.*

Herr, J. D., Thomas, Jr., J. R., Moise Analysis Method for Monitoring the Moderator Temperature Coefficient of Pressurized Water Reactors: II. Experimental, Nuclear Science and Engineering 108, 341-346 (1991).*

Y. Miyamoto et al., "L30 PWR ni Okeru Tokuichi Bunkaiho o Mochiita Noise Bunsekiho ni yoru Gensokuzai Ondo Han'nodo Keisuu no Hyoka no Kento", Atomic Energy Society of Japan '2006 Nen Aki no Taikai' Yokoshu, Aug. 17, 2006, p. 646.

International Search Report of PCT/JP2007/064897, Mailing Date of Oct. 16, 2007.

* cited by examiner

TIME

Fig. 5

COHERENCE

Fig. 6

NUMBER OF MTC IN
WHICH COHERENCE IS OVER PRESET VALUE

MODERATOR TEMPERATURE COEFFICIENT MEASUREMENT APPARATUS

TECHNICAL FIELD

The present invention relates to an apparatus and a method for processing detection data of a nuclear power plant.

BACKGROUND ART

For monitoring and controlling light water reactors, reactivity coefficients are used. As a major reactivity coefficient, the moderator temperature coefficient is used for a pressurized water reactor, and the void reactivity coefficient is used for a boiling water reactor.

In a currently implemented technique, to measure a moderator temperature coefficient of a pressurized water reactor, the following operations are performed for changing states of the nuclear power plant:

(1) By inserting control rods, the core power and the coolant temperature are decreased.

(2) The boron concentration in a coolant is controlled to be changed, and the control rods are recovered to their original positions. At this time, an added reactivity is recognized from an actual measured value of a change in boron concentration.

(3) A temperature coefficient is obtained from a change in coolant temperature and the added reactivity.

Also, as another technique, there is a known technique in which, without changing physical states of the plant, time series signals of a coolant temperature and a neutron flux are Fourier-transformed, and from the correlation between them, a moderator temperature coefficient is obtained.

As such the technique, Japanese Patent No. 2895101 discloses a method for measuring a moderator temperature coefficient of a nuclear reactor in operation. In this method, a temperature coefficient is extracted from noise—including signals of reactivity and a coolant temperature by the following manner. First, pieces of time series data on the reactivity and the coolant temperature are collected, and then respectively Fourier-transformed. Subsequently, a cross power spectral density function between the reactivity and the coolant temperature, and the auto power spectral density function of the coolant temperature are calculated. From the ratio between them, the moderator temperature coefficient is calculated.

Also, Japanese Laid-Open Patent Application JP-P2004-125444A discloses a technique in which a decay ratio is used as a core stability index to monitor a degree of stability of a nuclear reactor. The decay ratio is calculated by a singular value decomposition method.

DISCLOSURE OF INVENTION

There occurs some problems to change states of the nuclear power plant for measuring a moderator temperature coefficient, for example, the electrical power is decreased, extremely complicated plant operations are required, long time is needed and the like. From these viewpoints, it is desirable to be able to calculate the moderator temperature coefficient without changing the states of the reactor as described in the patent document 1.

However, a noise signal of the reactor to be measured includes various noise components, and therefore it may be difficult to obtain significant correlations simply only by performing the Fourier transform. In particular, if the output power of the reactor is not zero percent, noise components are increased, and therefore it becomes more difficult to extract the temperature coefficient from the noise signal.

It is therefore an object of the present invention to provide a measurement method and measurement apparatus that enable a parameter of a nuclear reactor, such as the moderator temperature coefficient or the void coefficient, to be more reliably measured.

Another object of the present invention is to provide a measurement method and measurement apparatus that enable a parameter of a nuclear reactor, such as the moderator temperature coefficient or the void coefficient, to be measured without changing states of a plant.

Still another object of the present invention is to provide a measurement method and measurement apparatus that enable a parameter of a nuclear reactor of any output power, such as the moderator temperature coefficient or the void coefficient, to be measured.

According to the present invention, a moderator temperature coefficient measurement apparatus includes: an input section configured to receive plant data including a coolant temperature signal being time series data on a temperature of a coolant of a light water reactor, and a reactivity signal indicating time series data on a reactivity calculated based on a detection value of a neutron flux in the light water reactor; a singular value decomposition section configured to decompose the coolant temperature signal into N components T'1 (t) to T'N (t), and the reactivity signal into M components ρ'1 (t) to ρ'M (t) by a singular value decomposition method;

a combination section configured to generate a selected combination being a combination of T'i (t) selected from the N components T'1 (t) to T'N (t) and ρ'j (t) selected from the M components ρ'1 (t) to ρ'M (t); and a temperature coefficient calculation section configured to calculate a moderator temperature coefficient based on auto and cross power spectral density functions obtained by applying a Fourier transform to the selected combination.

Preferably, a moderator temperature coefficient measurement apparatus further includes: an extrapolation section configured to generate temperature coefficient plot data for each frequency with use of auto and cross power spectral density functions obtained by applying a Fourier transform to each of the selected combinations selected by the combination section, wherein the temperature coefficient plot data includes a pair of a coherence and a moderator temperature coefficient, and calculate a moderator temperature coefficient at the coherence of 1 by extrapolating the temperature coefficient plot data.

Preferably, in a moderator temperature coefficient measurement apparatus, the input section receives a plurality of plant data different from each other. Each of the plurality of plant data corresponds to the plant data. The moderator temperature coefficient measurement apparatus further includes: a count section configured to count the number of high coherence data corresponding to the number of the temperature coefficient plot data, each of which the coherence calculated by the extrapolation section is larger than a predetermined criterion; and a high sensitive moderator temperature coefficient calculation section configured to judge and output the moderator temperature coefficient whose number of the high coherence data is judged to be large based on a predetermined criterion among the moderator temperature coefficient calculated by the temperature coefficient calculation section respectively corresponding to the plurality of plant data as a reliable moderator temperature coefficient.

Preferably, a moderator temperature coefficient measurement apparatus according the present invention further includes: an auto correlation screening section configured to extract combinations each of which has a strong correlation between the coolant temperature signal and the reactivity signal on a basis of an auto correlation function from N×M combinations of the N components T'i (t) and the M components ρ'j (t). The selected combinations are selected from the combinations extracted by the auto correlation screening section.

According to the present invention, a void coefficient measurement apparatus includes: an input section configured to receive plant data including a void fraction signal being time series data on a void fraction of a boiling water reactor, and a reactivity signal indicating time series data on a reactivity calculated based on a detection value of a neutron flux in the boiling water reactor; a singular value decomposition section configured to decompose the void fraction signal into N components B'1 (t) to B'N (t), and the reactivity signal into M components ρ'1 (t) to ρ'M (t) by a singular value decomposition method; a combination section configured to generate a selected combination being a combination of B'i (t) selected from the N components B'1 (t) to B'N (t) and ρ'j (t) selected from the M components ρ'1 (t) to ρ'M (t); and a void coefficient calculation section configured to calculate a void fraction based on auto and cross power spectral density functions obtained by applying a Fourier transform to the selected combination.

According to the present invention, a moderator temperature coefficient measurement method includes: receiving plant data including a coolant temperature signal being time series data on a temperature of a coolant of a light water reactor, and a reactivity signal indicating time series data on a reactivity calculated based on a detection value of a neutron flux in the light water reactor; decomposing the coolant temperature signal into N components T'1 (t) to T'N (t), and the reactivity signal into M components ρ'1 (t) to ρ'M (t) by a singular value decomposition method; generating a selected combination being a combination of T'i (t) selected from the N components T'1 (t) to T'N (t) and ρ'j (t) selected from the M components ρ'1 (t) to ρ'M (t); and calculating a moderator temperature coefficient based on auto and cross power spectral density functions obtained by applying a Fourier transform to the selected combination.

According to the present invention, a moderator temperature coefficient measurement program for making a computer execute a method including the steps of: receiving plant data including a coolant temperature signal being time series data on a temperature of a coolant of a light water reactor, and a reactivity signal indicating time series data on a reactivity calculated based on a detection value of a neutron flux in the light water reactor; decomposing the coolant temperature signal into N components T'1 (t) to T'N (t), and the reactivity signal into M components ρ'1 (t) to ρ'M (t) by a singular value decomposition method; generating a selected combination being a combination of T'i (t) selected from the N components T'1 (t) to T'N (t) and ρ'j (t) selected from the M components ρ'1 (t) to ρ'M (t); and calculating a moderator temperature coefficient based on auto and cross power spectral density functions obtained by applying a Fourier transform to the selected combination.

According to the present invention, a measurement method and measurement apparatus are provided, by which a parameter of a nuclear reactor, such as the moderator temperature coefficient or the void coefficient, can be more reliably measured.

Also, according to the present invention, a measurement method and measurement apparatus are provided, by which a parameter of a nuclear reactor, such as the moderator temperature coefficient or the void coefficient, can be measured without changing states of the plant.

Further, according to the present invention, a measurement method and measurement apparatus are provided, by which a parameter of the nuclear reactor of any output power, such as the moderator temperature coefficient or the void coefficient, can be measured.

BEST MODE FOR CARRYING OUT THE INVENTION

Figure 1:
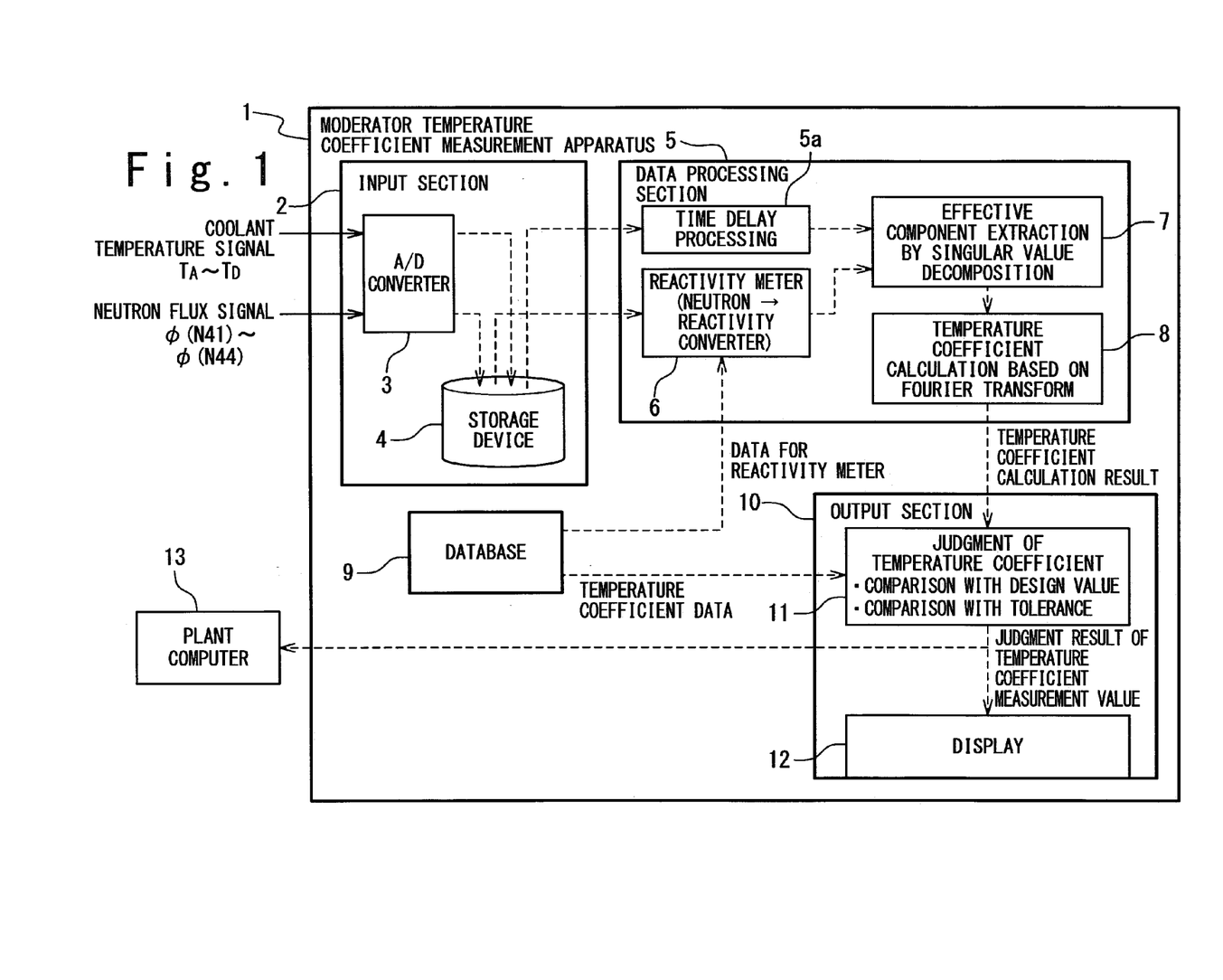
FIG. 1 illustrates a configuration of a moderator temperature coefficient measurement apparatus.

Best modes for carrying out the present invention will hereinafter be described referring to the accompanying drawings. FIG. 1 illustrates a configuration of a moderator temperature coefficient measurement apparatus.

The moderator temperature coefficient measurement apparatus 1 according to the present embodiment is used to measure a moderator temperature coefficient of a pressurized water reactor.

A plurality of coolant temperature detectors for detecting coolant temperatures are provided with the nuclear reactor being a target of the moderator temperature coefficient detection performed by the moderator temperature coefficient measurement apparatus 1. The plurality of temperature detectors outputs a coolant temperature signal including time series information on each detected temperature. In the present embodiment, a 4-loop nuclear reactor including four steam generators is subjected to the measurement. The temperature detectors detect coolant temperatures in low temperature side piping (cold legs) of the respective loops to generate and output four coolant temperature signals TA, TB, TC, and TD.

For the coolant temperature signal, instead of the coolant temperature in the low temperature side piping, a coolant temperature in a high temperature side piping (hot leg), an average of the coolant temperatures in the low and high temperature side piping, or a coolant outlet temperature of the nuclear reactor may be used.

In following description, when one of the coolant temperature signals TA, TB, TC, and TD is focused on, it is described as a coolant temperature signal T. The coolant temperature T at time t in time series is indicated by the coolant temperature signal T (t).

The nuclear reactor further includes a plurality of neutron flux detectors each for detecting a neutron flux. Each of the plurality of neutron flux detectors outputs a neutron flux signal including time series information on the neutron flux detected thereby. In the present embodiment, four neutron flux signals ϕ (N41), ϕ (N42), ϕ (N43), and ϕ (N44) are used to measure the moderator temperature coefficient.

In following description, when any one of the neutron flux signals ϕ (N41), ϕ (N42), ϕ (N43), and ϕ (N44) is focused on, it is described as a neutron flux signal cp. The neutron flux signal φ at time t in time series is indicated by a neutron flux signal φ (t).

The moderator temperature coefficient measurement apparatus 1 includes an input section 2, a data processing section 5, a database 9, and an output section 10. The input section 2 includes an A/D converter 3 and a storage device 4. The A/D converter 3 receives the four coolant temperature signals TA to TD and the four neutron flux signals φ (N41) to φ (N44) which are analog signals, to convert them into digital signals, and registers these digital signals in the storage device 4. If the coolant temperature signals TA to TD and the neutron flux signals φ (N41) to φ (N44) are given as digital signals, the A/D converter is not necessary.

The data processing section 5 includes a time delay processing section 5a, a reactivity meter 6, and first and second data processing sections 7 and 8.

The time delay processing section 5a is implemented in a computer. The time delay processing section 5a reads the coolant temperature signal T (t) from the storage device 4, and performs time shifting processing if there is some time shift with respect to the reactivity signal ρ (t) explained later. For example, if the coolant temperature signal T (t) is relatively delayed to the reactivity signal ρ (t), the time delay processing section 5a performs the time delay processing so as to delay the reactivity signal ρ (t) relative to the coolant temperature signal T (t) to generate and output a plurality of coolant temperature signals respectively having different delay times.

The reactivity meter 6 reads the neutron flux signal φ from the storage device 4 and also reads information specific to the reactor core from the database 9. The reactivity meter 6 calculates reactivity from the read neutron flux signal in accordance with a calculation program which is based on one point reactor approximate kinetics calculations to generate and output the reactivity signal ρ (t) including time series data on the reactivity.

The first data processing section 7 is implemented in a computer. The coolant temperature signal outputted by the time delay processing section 5a is inputted into the first data processing section 7. Further, the reactivity signal ρ (t) outputted by the reactivity meter 6 is inputted into the first data processing section 7. The first data processing section 7 outputs components obtained by singular value decomposition of these pieces of input data.

Figure 2:
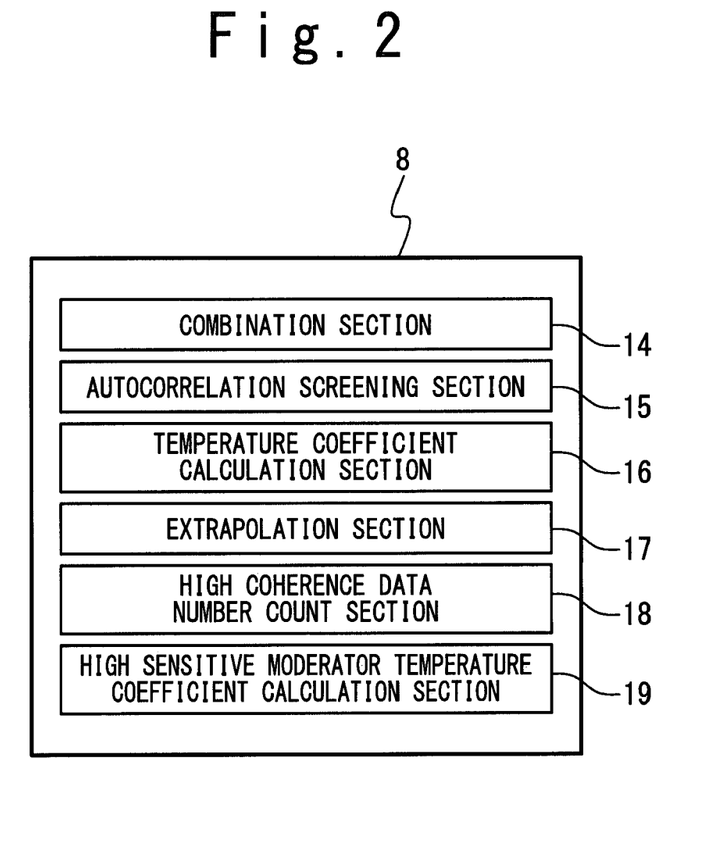
FIG. 2 illustrates a configuration of the second data processing section.

FIG. 2 illustrates a configuration of the second data processing section 8. The second data processing section 8 includes a combination section 14, an autocorrelation screening section 15, a temperature coefficient calculation section 16, an extrapolation section 17, a high coherence data number count section 18, and a high sensitive moderator temperature coefficient calculation section 19. Each of these sections is implemented in such a way that a program stored in a storage device of a computer provided in the second data processing section 8 is read and executed by an arithmetic and control unit. The second data processing section 8 uses a singular value decomposed components inputted from the first data processing section 7 to calculate and output the moderator temperature coefficient.

The output section 10 is implemented in a computer. The output section 10 includes a temperature coefficient judgment section 11 and a display device 12. The temperature coefficient judgment section 11 displays the moderator temperature coefficient received from the second data processing section 8 on the display device 12 along with results of comparisons of it with a design value and a tolerance.

The output of the temperature coefficient judgment section 11 is transmitted to a plant computer 13 which controls an operation of the nuclear reactor and used for controlling the nuclear reactor.

Figure 3:
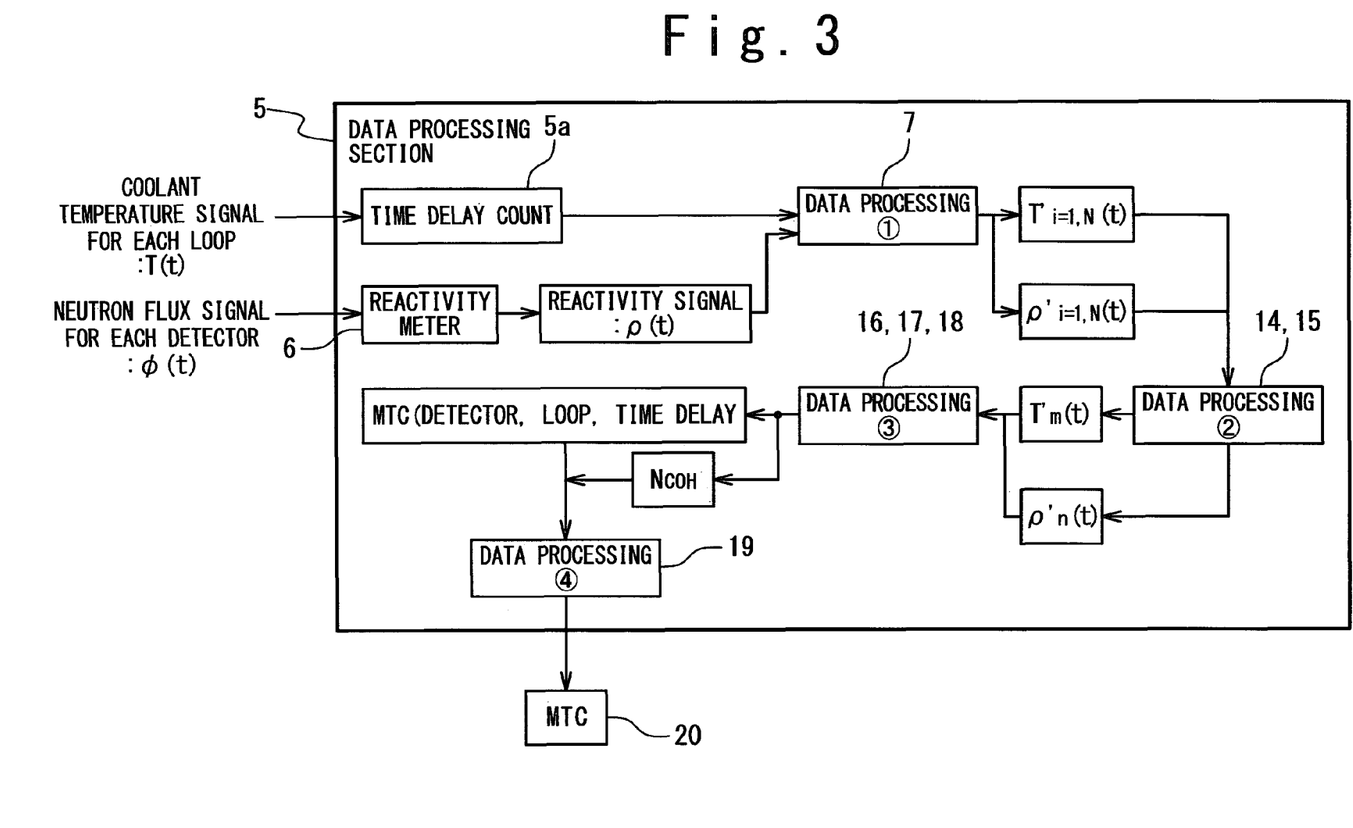
FIG. 3 illustrates a data processing flow.

Next, referring to the data processing flow illustrated in FIG. 3, an operation of the moderator temperature coefficient measurement apparatus 1 provided with the above-described configurations is described.

Figure 4:
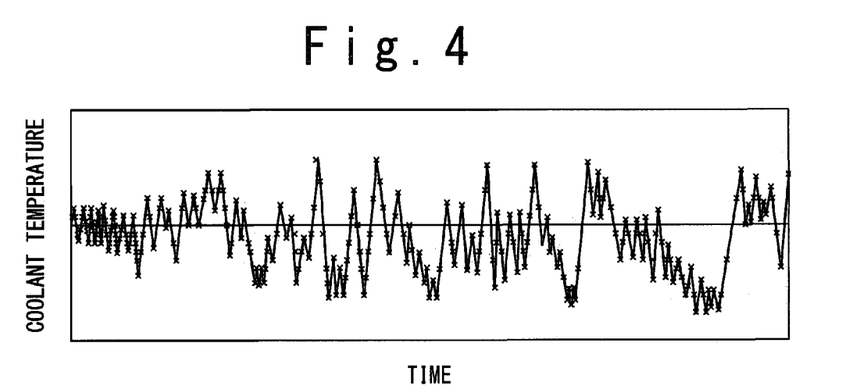
FIG. 4 illustrates an example of measured values of coolant temperature.

The coolant temperature detectors installed on the cold legs measure the coolant temperatures in time series to output the coolant temperature signals TA (t) to TD (t) (which are, in FIG. 3, collectively illustrated as T (t)). In FIG. 4, an example of the measured coolant temperature is illustrated. The coolant temperature signals TA (t) to TD (t) are converted into pieces of digital data by the A/D converter 3, and then registered in the storage device 4.

The time delay processing section 5a reads the coolant temperature signal T (t) from the storage device 4 to perform time delay processing. This processing is performed such that, for example, if the coolant temperature signal is delayed relative to the reactivity signal, the data of the reactivity signal is delayed relative to that of the coolant temperature signal. In other words, time advance processing is performed so that the data of the reactivity signal is temporally advanced relative to that of the coolant temperature signal. The time advance processing for advancing time of the coolant temperature signal is described below.

The plurality of coolant temperature signals respectively having different time advances are generated as follows: for example, a zeroth coolant temperature signal T0 (t) is the same as T (t) read from the storage device 4;

a first coolant temperature signal T1 (t) represents data advanced by 0.1 seconds relative to T (t), that is, T1 (t)=T (t−0.1); and similarly, an i-th coolant temperature signal Ti (t) (i is an integer) represents data advanced by (0.1×i) seconds relative to T (t), that is, Ti (t)=T (t−0.1×i)

In this manner, the coolant temperature signals T0 (t) to T50 (t), i.e., fifty-one coolant temperature signals respectively having the time advances of 0 to 5 seconds, are generated and outputted.

The neutron flux detectors detect the neutron fluxes generated by the nuclear reactor in time series to output the neutron flux signals φ (N41) to φ (N44) (which are, in FIG. 3, collectively illustrated as φ (t)). The neutron flux signal φ (t) is converted into digital data by the A/D converter 3, and then registered in the storage device 4. The reactivity meter 6 uses the neutron flux signal φ (t) to calculate the reactivity, and outputs the reactivity signal ρ (t).

The first data processing section 7 receives the pieces of data from the time delay processing section 5a and the reactivity meter 6. Here, types of the pieces of data inputted to the first data processing section 7 are organized.

There are four types of coolant temperature signals T0 (t) to T50 (t) correspondingly to the four types of coolant temperature signals TA to TD inputted to the input section 2. That is, (4×51) types of data that indicate the coolant temperatures in time series are inputted to the first data processing section 7.

Also, there are four types of reactivity signals ρ (t) correspondingly to the four types of neutron flux signals φ (N41) to φ (N44) inputted to the input section 2. That is, four types of data that indicate the reactivity in time series is inputted to the first data processing section 7.

The first data processing section 7 performs the singular value decomposition for each of the (4×51) types of coolant temperature signals in the time axis direction of the time series to decompose it into N components T'i=1, N (t). Here, i is a suffix for specifying each of the components obtained by the singular value decomposition.

The first data processing section 7 further performs the singular value decomposition of each of the four types of reactivity signals ρ in the time axis direction of the time series to decompose it into N components ρ'j=1, N (t). Here, j is a suffix for specifying each of the components obtained by the singular value decomposition.

In the processing performed in and subsequent to the second data processing section 8, a correlation between the coolant temperature signals T0 (t) to T50 (t) and the reactivity ρ (t) calculated on the basis of the neutron flux signals φ (t) corresponding to times respectively delayed by 0 to 5 seconds relative to the coolant temperature signals T0 (t) to T50 (t) is calculated. The physical meaning of the time delay processing is as follows: the coolant flowing through the nuclear reactor flows in from the cold legs; flows downward along the core tank to the lower plenum; and reaches the reactor core. In some cases, there is a time delay of few seconds until the coolant at a position of the cold leg at which a temperature is detected reaches the reactor core. That is, there may be a time delay of few seconds until a variation in neutron flux in response to a variation in coolant temperature arises. Accordingly, to detect a correlation between the coolant temperature and the reactivity ρ (t) calculated from the neutron flux, it is considered appropriate to make a correlation between the coolant temperature and the re activity ρ (t) calculated from the neutron flux subjected to the time delay processing relative to the coolant temperature. Alternatively, the temperature detectors may be installed in a hot leg. In this case, conversely, it is appropriate to make a correlation between the coolant temperature and the reactivity ρ (t) calculated from the neutron flux subjected to the time advance processing relative to the coolant temperature.

The combination section 14 of the second data processing section 8 generates pairs of T'i=1, N (t) and ρ'j=1, N (t) for all combinations of i (1 or more, and N or less) and j (1 or more, and N or less). As a result, from one pair of T (t) and φ (t), (N×N) pairs of T' (t) and ρ' (t), i.e., [T'i (t), ρ'j (t)], are generated. There are (4×51) pairs of T (t) and ρ (t) as described above, and consequently (4×51×N×N) pairs of [T'i (t), ρ'j (t)] are generated.

The autocorrelation screening section 15 of the second data processing section 8 uses autocorrelation functions of T'i (t) and ρ'j (t) to extract pairs of signals respectively having strong correlations as high correlation pairs [T'm (t), ρ'n (t)] for each of the pairs [T'i (t), ρ'j (t)]. As a method for extracting the strong correlation signal pairs, for example, it is preferable to extract as the high autocorrelation pairs [T'm (t), ρ'n (t)] of signals having a minimum value obtained by integrating the difference between the normalized autocorrelation function of T'i (t) and that of ρ'j (t) with respect to time for each of the pairs [T'i (t), ρ'j (t)].

Figure 5:
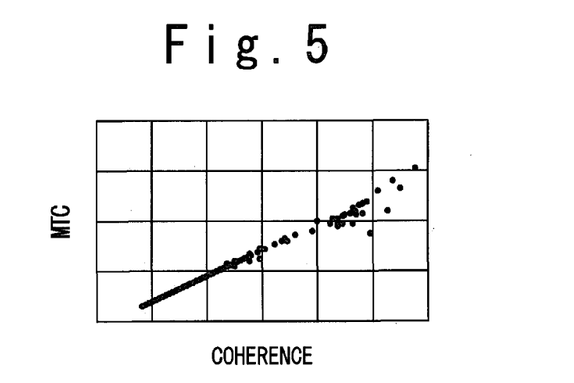
FIG. 5 illustrates a relationship between the coherence obtained by the Fourier transform of the high-autocorrelation pair of coolant temperature and reactivity, and the MTC.

The temperature coefficient calculation section 16 of the second data processing section 8 uses auto and cross power spectral density functions to calculate the MTC (moderator temperature coefficient, or moderator temperature reactivity coefficient) and coherence for each of the high autocorrelation pairs [T'm (t), ρ'n (t)] on a frequency basis through the Fourier transform. FIG. 5 illustrates a diagram in which a correlation between the calculated coherence and the MTC is plotted.

The coherence COH is expressed by COH=α×T/ρ, given that α is the value of the MTC. ρ, α, and T meet the relationship of ρ≈α×T, and therefore α at COH=1 is considered as an approximately true MTC value.

The extrapolation section 17 obtains a correlation between the coherence and the MTC illustrated in FIG. 5 on the basis of the least-square method or the like, and extrapolates the correlation to calculate the MTC at the coherence of 1.0. By this calculation, one MTC is calculated for each of the high autocorrelation pairs [T'm (t), ρ'n (t)].

The high coherence data number count section 18 counts a high coherence data number NCOH as the number of points having coherences larger than a predetermined criterion among points indicating the coherence-MTC pairs as plotted in FIG. 5. The largeness of this number means that the width of the interpolation is small, and the reliability of the MTC value obtained by the extrapolation at COH=1 is high.

Figure 6:
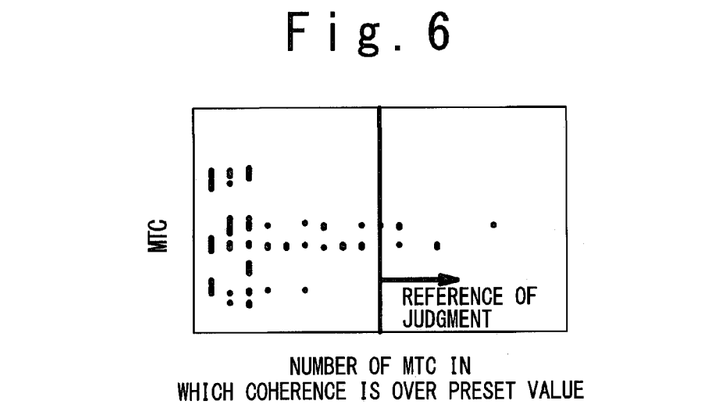
FIG. 6 illustrates a relationship between the number of the high coherence data and MTC.

FIG. 6 illustrates a diagram in which the high coherence data number NCOH and MTC are plotted with being correlated to each other for each of the high autocorrelation pairs [T'm (t), ρ'n (t)]. In the diagram, as the value along the horizontal axis NCOH increases, a larger number of pieces of high coherence data can be obtained, which means the reliability of the data is higher. Referring to the diagram, one can see that a variation in MTC tends to be smaller toward the right-hand side. In particular, in a region where NCOH is larger than the predetermined criterion, the variation in MTC is small. The high sensitive moderator temperature coefficient calculation section 19 of the second data processing section 8 uses such tendency to calculate MTC, which is considered to be closer to the true value, as a high sensitive MTC 20. For example, by averaging MTCs in the region where NCOH is larger than the predetermined criterion, the high sensitive MTC is calculated.

Returning to FIG. 1, the calculated high sensitive MTC is transmitted to the temperature coefficient judgment section 11. The temperature coefficient judgment section 11 reads out an expected value, upper and lower limits of the temperature coefficient on a design from the database 9, and displays them on the display device 12 along with the high sensitive MTC received from the second data processing section 8.

As a variation of the moderator temperature coefficient measurement apparatus in the present embodiment, a void reactivity coefficient measurement apparatus for measuring a void reactivity coefficient of a boiling water reactor can be implemented. In this case, a void fraction calculation section for calculating the void fraction in time series on the basis of measurement values of the nuclear reactor is used in combination. Also, to the input section 2, a time series void fraction signal calculated by the void fraction calculation section is inputted, instead of the coolant temperature signal in the moderator temperature coefficient measurement apparatus 1. The subsequent calculation is performed in the same manner as that in the present embodiment with the coolant temperature signal being replaced by the void fraction. As a result, the void reactivity coefficient can be calculated, instead of the moderator temperature coefficient.

The invention claimed is:
1. A moderator temperature coefficient measurement apparatus, comprising:
an input unit having at least one storage device, the input unit receiving plant data including a coolant temperature signal being time series data on a temperature of a coolant of a light water reactor, and a reactivity signal indicating time series data on a reactivity calculated based on a detection value of a neutron flux in the light water reactor; and
a data processing unit programmed to decompose the coolant temperature signal into N time-dependent tempera- ture components and the reactivity signal into M time-dependent reactivity components by a singular value decomposition method, wherein the data processing unit is programmed to generate at least one selected combination by selecting a temperature component from the N time-dependent temperature components and a reactivity component from the M time-dependent reactivity components for each of the at least one selected combination, each of the at least one selected combination consisting of the selected temperature component and the selected reactivity component, and wherein the data processing unit is programmed to calculate a moderator temperature coefficient based on auto and cross power spectral density functions obtained by applying a Fourier transformation to the at least one selected combination, wherein the data processing unit is programmed to extract combinations each of which has a strong correlation between the coolant temperature signal and the reactivity signal on a basis of an auto correlation function from N×M combinations of the N time-dependent temperature components and the M time-dependent reactivity components, and wherein the at least one selected combination is selected from the combinations extracted by the data processing unit.

2. The moderator temperature coefficient measurement apparatus according to claim 1, wherein the data processing unit is programmed to generate temperature coefficient plot data for respective frequencies with use of auto and cross power spectral density functions obtained by applying a Fourier transformation to each of the at least one selected combination, wherein the temperature coefficient plot data includes a pair of a coherence and a moderator temperature coefficient, and calculate a moderator temperature coefficient at a coherence of 1 by extrapolating the temperature coefficient plot data.

3. The moderator temperature coefficient measurement apparatus according to claim 2, wherein the input unit receives a plurality of plant data different from each other, each of the plurality of plant data corresponds to the plant data, and wherein the data processing unit is programmed to calculate moderator temperature coefficients for the plurality of plant data, respectively, to count a number of high coherence data corresponding to the number of the temperature coefficient plot data for which the coherence is larger than a predetermined criterion and to output a reliable moderator temperature coefficient for which a number of the high coherence data is judged to be large based on a predetermined criterion, the outputted moderator temperature coefficient being selected from among the moderator temperature coefficients respectively corresponding to the plurality of plant data.

4. A void reactivity coefficient measurement apparatus, comprising:

an input unit having at least one storage device, receiving plant data including a void fraction signal being time series data on a void fraction of a boiling water reactor, and a reactivity signal indicating time series data on a reactivity calculated based on a detection value of a neutron flux in the boiling water reactor; and a data processing unit programmed to decompose the void fraction signal into N time-dependent void fraction components, and the reactivity signal into M time-dependent reactivity components by a singular value decomposition method, wherein the data processing unit is programmed to generate at least one selected combination by selecting a void fraction component from the N time-dependent void fraction components and a reactivity component from the M time-dependent reactivity components for each of the at least one selected combination, each of the at least one selected combination consisting of the selected void fraction component and the selected reactivity component; and wherein the data processing unit is programmed-to calculate a void reactivity coefficient based on auto and cross power spectral density functions obtained by applying a Fourier transformation to the at least one selected combination, wherein the data processing unit is programmed to extract combinations each of which has a strong correlation between the void fraction signal and the reactivity signal on a basis of an auto correlation function from N×M combinations of the N time-dependent void fraction components and the M time-dependent reactivity components, and wherein the at least one selected combination is selected from the combinations extracted by the data processing unit.

5. A moderator temperature coefficient measurement method implemented on a moderator temperature coefficient apparatus including an input unit and a data processing unit, the method comprising:

by the input unit, receiving plant data including a coolant temperature signal being time series data on a temperature of a coolant of a light water reactor, and a reactivity signal indicating time series data on a reactivity calculated based on a detection value of a neutron flux in the light water reactor;

by the data processing unit, decomposing the coolant temperature signal into N time-dependent temperature components, and the reactivity signal into M time-dependent reactivity components by a singular value decomposition method;

by the data processing unit, generating at least one selected combination by selecting a temperature component from the N time-dependent temperature components-and a reactivity component from the M time-dependent reactivity components for each of the at least one selected combination, each of the at least one selected combination consisting of the selected temperature component and the selected reactivity component; and by the data processing unit, calculating a moderator temperature coefficient based on auto and cross power spectral density functions obtained by applying a Fourier transformation to the at least one selected combination, wherein the generating at least one selected combination includes:

extracting combinations each of which has a strong correlation between the coolant temperature signal and the reactivity signal on a basis of an auto correlation function from N×M combinations of the N time-dependent temperature components and the M time-dependent reactivity components; and selecting the at least one selected combination from the extracted combinations.

6. A computer program product embodied on a computer-readable medium and comprising code that, when executed, causes a computer to perform the following: receiving plant data including a coolant temperature signal being time series data on a temperature of a coolant of a light water reactor, and a reactivity signal indicating time series data on a reactivity calculated based on a detection value of a neutron flux in the light water reactor;

decomposing the coolant temperature signal into N time-dependent temperature components, and the reactivity signal into M time-dependent reactivity components by a singular value decomposition method;

generating at least one selected combination by selecting a temperature component from the N time-dependent temperature components and a reactivity component from the M time-dependent reactivity components for each of the at least one selected combination, each of the at least one selected combination consisting of the selected temperature component and the selected reactivity component; and calculating a moderator temperature coefficient based on auto and cross power spectral density functions obtained by applying a Fourier transformation to the at least one selected combination, wherein the generating at least one selected combination includes:

extracting combinations each of which has a strong correlation between the coolant temperature signal and the reactivity signal on a basis of an auto correlation function from N×M combinations of the N time-dependent temperature components and the M time-dependent reactivity components; and selecting the at least one selected combination from the extracted combinations.

* * * * *